(No Model.)
B. A. FISKE.
APPARATUS FOR CONTROLLING ELECTRIC MOTORS.
No. 584,341. Patented June 15, 1897.
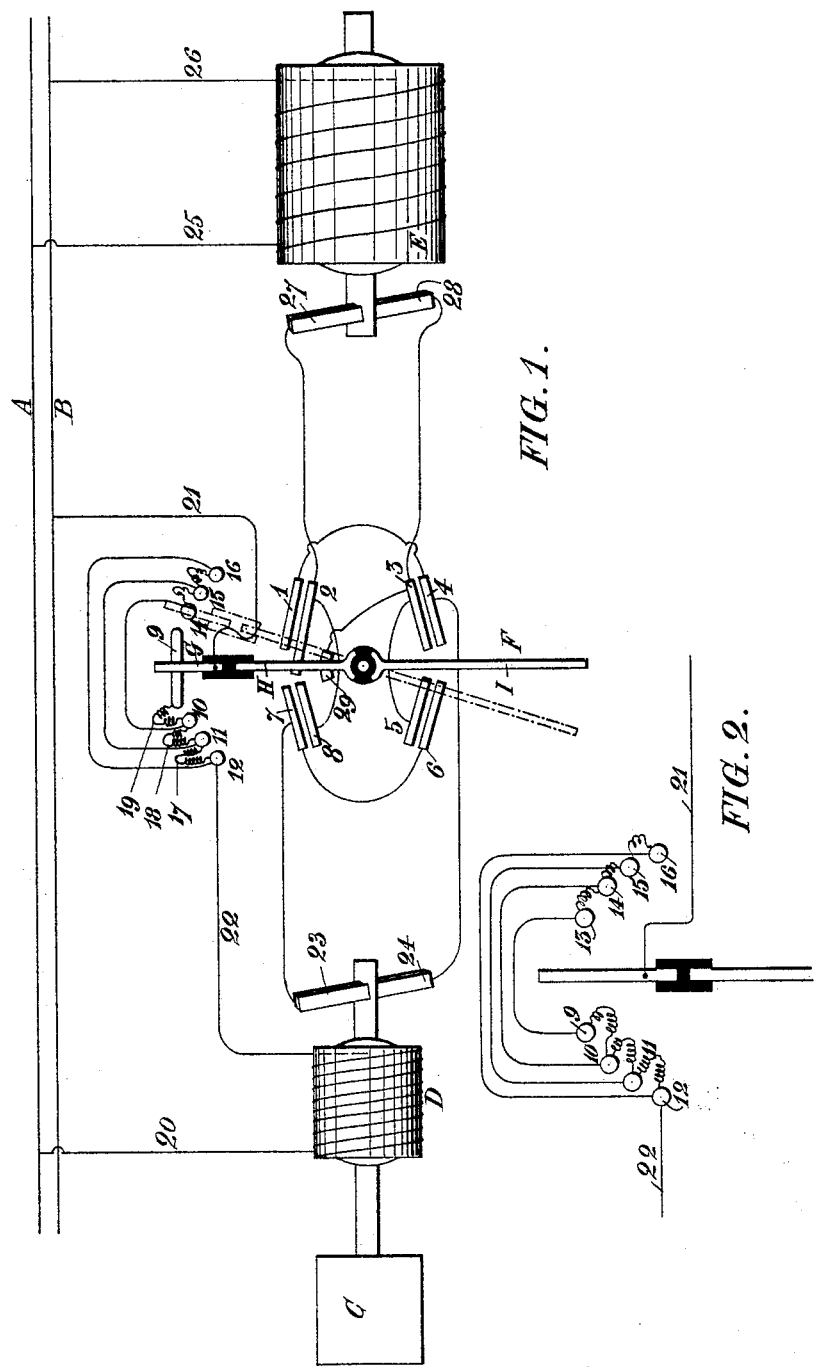
WITNESSES:
H. R. Mollen
J. A. Van West
INVENTOR
Bradley A. Fiske
BY
Park Benjamin
his ATTORNEY.

UNITED STATES PATENT OFFICE.

BRADLEY ALLAN FISKE, OF THE UNITED STATES NAVY.

APPARATUS FOR CONTROLLING ELECTRIC MOTORS.

SPECIFICATION forming part of Letters Patent No. 584,341, dated June 15, 1897.

Application filed March 6, 1896. Serial No. 582,113. (No model.)

*To all whom it may concern:*

Be it known that I, BRADLEY ALLAN FISKE, of the United States Navy, have invented a new and useful Improvement in Apparatus for Controlling Electric Motors, of which the following is a specification.

The invention is an apparatus for controlling an electric motor, so that said motor can be caused to run in one direction or the other at a desired speed or stopped instantly, and wherein said control is effected by the movement of a single hand-lever and without the use of resistances interposed in the armature-circuit of the generator which supplies the motor.

The accompanying drawing is an electrical diagram.

A and B are the positive and negative conductors communicating with any suitable electrical generator.

C is any motor, such as a steam-engine. D is a dynamo actuated by said engine.

E is the electric motor, the operation of which is to be controlled by my apparatus.

1 and 2, 3 and 4, 5 and 6, and 7 and 8 are pairs of contact-plates.

F is a switch-lever having the parts H and I of conducting material insulated from one another, as shown, and suitably pivoted, so as to make contact with said plates, as hereinafter described.

9, 10, 11, 12, 14, 15, and 16 are fixed contact-plates disposed in the path of movement of lever F. Said lever when in central position makes contact with the plate 9. Between the plates 9 10 11 12 are interposed resistances 17 18 19. The pairs of plates 10 and 14, 11 and 15, and 12 and 16 are connected by wires of low resistance, as shown.

The circuit connections in the apparatus are as follows: One terminal of the field-coil of dynamo D is connected by wire 20 to one main conductor, as A. The other terminal is connected by wire 22 to contact-plate 12. The main conductor B is connected by wire 21 to the end G of the switch-lever F, the end being insulated from the part H of said lever. When the end G of lever F is in contact with any plate, as 9 10 11 12 14 15 16, then circuit is completed from the field-coil of dynamo D through one or more or none of the resistances 17 18 19. In this way the said field-coil is at all times energized from the main conductors A B or line; but this is not essential, inasmuch as, if desired, said coil may be energized from any other electrical source.

The brush-terminals 23 24 of dynamo D are connected to contact-plates 4 and 7.

The terminals of the field-coil of the electric motor E are connected by wires 25 and 26 to the main conductors A B. The armature-terminals 27 and 28 of said motor are connected to contact-plates 2 and 3. Contact-plates 1 and 4 are connected together; so, also, are contact-plates 3 and 5, 6 and 7, and 2 and 8. Contact-plate 3 is connected also to a separate fixed contact-plate 29. The contact-plate 2 is elongated, so that the part H of lever F when said lever is in central position, as represented, makes contact with it. When the lever F is in the central position shown, the motor is at rest, since circuit is closed between the brushes 27 28 from plate 3 to plate 29 through part H of lever F and plate 2, and the circuit also between the brushes of the dynamo is open.

Assume that it is desired to start the motor to rotate to the right. Lever F is moved to the right, so as to bridge the contact-plates 1 and 2 by its arm H and 5 and 6 by its arm I. Circuit is then established as follows: from brush 23 of dynamo D to plate 7, to plate 6, arm I on lever F, plate 5, plate 3, brush 28 of armature of motor E and through the armature-coil to the other brush 27, to plate 2, arm H on lever F, plate 1, plate 4, and so to the other brush 24 of dynamo D. The field-coil of the motor E being energized from the main conductors A B or any other source and a current from brush 28 to brush 27 being established in the armature-coil, the armature rotates, say, to the right.

If it be desired to cause the motor to turn to the left, the lever F is moved to bridge the contact-plates 7 and 8 by arm H and 3 and 4 by arm I. Circuit is then established as follows: from brush 23 of dynamo to plate 7, arm H on lever F, plate 8, plate 2, brush 27 of motor E, through the armature-coil to brush 28, plate 3, arm I on lever F, plate 4, and so to brush 24 of dynamo. The current is then established in the armature-coil from brush 27 to brush 28, and said armature then rotates in the reverse direction.

The object of the contact-plates and resistances 17 18 19, interposed in the field-circuit of the dynamo D, is to graduate the speed of rotation of the motor E. Thus assume that the lever F, being moved to the right, still remains on plate 9. Then circuit from the dynamo will continue to proceed through all of the resistances 17 18 19 to said plate 9, to end G, and so to conductor B. If the end G be still farther moved to the right to make contact with plate 14, then only resistances 17 18 will be in circuit, and when finally said end makes contact with plate 16 none of the said resistances will be in circuit. The same result happens when the lever is moved to the left, all of the resistances being in circuit so long as it is in contact with plate 9 and none when it is in contact with plate 12. Hence the farther the switch-lever F is moved from its central position in one direction or the other the less is the resistance interposed in the field-circuit of the dynamo D, the greater the strength of current energizing said coil, and the greater the electromotive force of the current generated by the dynamo and delivered to the motor E, and hence the greater the speed of the motor. Therefore the movement of the lever F in one direction or the other determines the direction of rotation of the armature of the motor E, while the extent of movement of said lever at the same time determines the speed of said rotation. The final result is complete control of the motor by means of the single lever F. If that lever be moved to the right, the motor rotates, say, to the right, and the farther the lever is moved the faster the motor runs. So, also, if the lever be moved to the left; and to stop the motor instantly the lever F is shifted to its central position, as shown, when armature-circuit of dynamo is broken and the circuit between the motor-brushes 27 and 28 is closed.

In place of the arrangement of contact-plates and resistances shown in Fig. 1 I may use that shown in Fig. 2. Here, instead of a single elongated contact-plate 9, two contact-plates 9 and 13 are used. When the end G of lever F touches either of these plates, all of the resistances are in circuit, and when it is in its central position, as shown, the field-circuit in the dynamo is broken.

It will be observed that I use no resistances in the armature-circuit of the dynamo or motor, and hence expend none of the energy of the current generated by the dynamo in overcoming the heavy resistances which ordinarily would be required to reduce or vary the electromotive force applied at the brushes 27 and 28; nor do I require two independent devices—one to vary the electromotive force of the current and the other to reverse the current in the motor—both results being simultaneously accomplished by the simple movement of the lever F. The contact-plates 1 2 3 4 5 6 7 8 are made long enough so that the lever will touch them when placed on contact-plates 9 to 16, except when in its central position.

I find it advantageous in some cases to carry the armature-circuit of dynamo D around the field, thus rendering the dynamo compound-wound. In the arrangement shown in Fig. 1 the field of dynamo D is always in circuit with the main conductors or other source of electricity, so that said field is always in energized state. The advantage of this is that the magnetic lag and impedance in the field-coil, which occurs on the establishment of circuit therein, are lessened, and the dynamo is ready at any instant to deliver an effective current.

It will further be observed that the reversal of the current occurs when the resistances 17 18 19 are in circuit and always when the voltage is low, so that the danger of burning contacts or other injury incident to the sudden reversal of the high electromotive force is greatly diminished.

I claim—

1. The combination with an electric motor of an electric generator, means for varying the electromotive force of said generator, means for reversing the current between generator and motor, and mechanism whereby said current-varying and current-reversing devices may be conjointly operated, substantially as described.

2. The combination with an electric motor of a dynamo actuating the same, means for arresting or changing the direction of the current in the armature-circuit of said motor, and means for gradually increasing and diminishing the electromotive force of said dynamo, and mechanism whereby said current-varying and current-reversing devices may be conjointly operated, substantially as described.

3. The combination with an electric motor of a dynamo actuating the same, means for arresting or changing the direction of the current in the armature-circuit of said motor, means for gradually increasing and diminishing the electromotive force of said dynamo, and a controlling device whereby said current-varying and current-reversing devices may be conjointly operated; whereby when said controlling device is placed in one position the motion of said armature is stopped, and when moved in either direction on each side of said position, said armature is caused to rotate in corresponding direction and with a speed bearing a relation to the extent of travel of said controlling device, substantially as described.

4. The combination of an electric motor, a dynamo actuating the same, a reversing-switch in the armature-circuit of said dynamo, and a rheostat in the field-circuit of said dynamo and controlled by said reversing-switch, substantially as described.

5. The combination with an electric motor, a dynamo actuating the same, and circuit connections between the armature of said motor and said dynamo substantially as set forth of a pivoted switch-lever F, contact-plates 3, 4, 7, 8 in said armature-circuit, means of energizing the field of said dynamo, resistances as 17, 18, 19 and contact-plates as 10, 11, 12 and a movable contact-piece controlled by said lever F and interposed in the field-circuit of said dynamo, substantially as described.

6. The combination with an electric motor a dynamo actuating the same and circuit connections substantially as set forth of a pivoted reversing switch-lever F, contact-plates 1, 2, 3, 4, and 5, 6, 7, 8, contact-plates as 9, 10, 11, 12 and 14, 15, 16 and resistances interposed between said last-named contact-plates; said contact-plates 9 to 16 and resistances being interposed in the field-circuit of said dynamo, substantially as described.

BRADLEY ALLAN FISKE.

Witnesses:
H. R. MOLLER,
I. A. VAN WART.